United States Patent
Yu et al.

(10) Patent No.: US 7,839,823 B2
(45) Date of Patent: Nov. 23, 2010

(54) APPARATUS AND METHOD FOR TRANSMITTING A CONTROL CHANNEL MESSAGE IN A MOBILE COMMUNICATION SYSTEM

(75) Inventors: Jae-Chon Yu, Suwon-Si (KR); Hwan-Joon Kwon, Hwanseong-si (KR); Jin-Kyu Han, Seoul (KR); Dong-Hee Kim, Yongin-si (KR); Yeon-Ju Lim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 682 days.

(21) Appl. No.: 11/853,630

(22) Filed: Sep. 11, 2007

(65) Prior Publication Data

US 2008/0080421 A1    Apr. 3, 2008

(30) Foreign Application Priority Data

Sep. 11, 2006    (KR) .................... 10-2006-0087693

(51) Int. Cl.
*H04Q 7/00* (2006.01)
(52) U.S. Cl. ..................................... 370/329
(58) Field of Classification Search ......... 370/206–210, 370/328–339
See application file for complete search history.

(56) References Cited

U.S. PATENT DOCUMENTS 6,807,147 B1    10/2004    Heinonen et al.

(Continued)

FOREIGN PATENT DOCUMENTS

KR    1020060039776    5/2006

(Continued)

OTHER PUBLICATIONS

3GPP TR 25.814 V7.0.0, evolved Universal Terrestrial Radio Access (UTRA) (Release 7), 3GPP, 126 pages, 2006.*

(Continued)

*Primary Examiner*—Frank Duong
(74) *Attorney, Agent, or Firm*—The Farrell Law Firm, LLP

(57) ABSTRACT

Disclosed is an apparatus and a method for transmitting a control channel message, which can reduce resource waste in an OFDM system multiplexing and using a Block Resource Channel (BRCH) and a Distributed Resource Channel (DRCH) in a frequency axis. The apparatus includes a controller for generating a predetermined field and outputting a control channel message including the predetermined field, the predetermined field indicating a precoding index when a common pilot is used for data demodulation in a mobile station and indicating a pilot format of a dedicated pilot when the dedicated pilot is used for data demodulation in the mobile station, the precoding index indicating a weight value for beam-forming of each antenna; and a transmission module for converting the control channel message into a wireless signal and transmitting the wireless signal to the mobile station. The apparatus and method can reduce the resource waste of a control channel by inserting different pieces of information into a predetermined field included in the control channel message according to the channel type and the multiplexing mode of a resource channel in an Orthogonal Frequency Division Multiplexing (OFDM) system, and enables the efficient use of resources by transmitting different types of control information through redundant bits of a control channel message.

24 Claims, 8 Drawing Sheets

U.S. PATENT DOCUMENTS

| | | | |
|---|---|---|---|
| 7,042,857 B2 | 5/2006 | Krishnan et al. | |
| 7,110,378 B2 * | 9/2006 | Onggosanusi et al. | 370/334 |
| 7,697,622 B2 * | 4/2010 | Han et al. | 375/260 |
| 2006/0268676 A1 * | 11/2006 | Gore et al. | 370/210 |
| 2007/0004465 A1 * | 1/2007 | Papasakellariou et al. | 455/571 |
| 2007/0165568 A1 * | 7/2007 | Damnjanovic et al. | 370/329 |
| 2007/0206558 A1 * | 9/2007 | Akita et al. | 370/344 |
| 2007/0242636 A1 * | 10/2007 | Kashima et al. | 370/329 |

FOREIGN PATENT DOCUMENTS

KR    1020060115293    11/2006

OTHER PUBLICATIONS

Source: China Unicom, Huawei Technologies, KDDI, Lucent Technologies, Motorola, Nortel Networks, QUALCOMM Incorporated, RITT, Samsung Electronics, 2TE; "Framework Proposal for LBC Mode of Rev C", Jun. 26, 2006.

* cited by examiner

APPARATUS AND METHOD FOR TRANSMITTING A CONTROL CHANNEL MESSAGE IN A MOBILE COMMUNICATION SYSTEM

PRIORITY

This application claims priority under 35 U.S.C. §119(a) to a Korean Patent Application entitled "Apparatus And Method For Transmitting A Control Channel Message In A Mobile Communication System" filed in the Korean Intellectual Property Office on Sep. 11, 2006 and assigned Serial. No. 2006-87693, the contents of which are incorporated herein by reference.

BACKGROUND OF THE INVENTION

1. Field of the Invention

The present invention relates to a mobile communication system, and in particular, to an apparatus and a method for transmitting/receiving a control channel message in a mobile communication system.

2. Description of the Related Art

In general, wireless communication systems have been developed to handle situations in which it is impossible to connect a fixed wire network up to a remote terminal. Examples of such wireless communication systems include various mobile communication systems, such as a wireless Local Area Network (LAN) system, a Wireless Broadband Internet (WiBro) system, a mobile Ad hoc system, an Ultra Mobile Broadband (UMB) system, etc.

A mobile communication system is based on the mobility of a user as opposed to a simple wireless communication system, where the ultimate object of a mobile communication system is to enable exchange of information media between people any time and anywhere by using a Mobile Station (MS), such as a mobile phone, a Personal Data Assistant (PDA), or a wireless pager. With rapid development of communication technology, the current mobile communication systems can provide, through a mobile station, not only conventional voice communication services, but also high speed data services capable of transmitting large capacity digital data, such as moving images, for example, as well as still images or even E-mail.

A representative example of a mobile communication system that provides high speed data services using multi-carrier transmission schemes is an Orthogonal Frequency Division Multiplexing (OFDM) system. OFDM is a scheme for converting a serially input symbol stream into parallel signals and then transmitting the converted signals through multiple sub-carriers having a mutual orthogonality. The OFDM method of data transmission came into the spotlight around the time of the development of Very Large Scale Integration (VLSI) technology in the early 1990's.

The OFDM scheme modulates data by using multiple sub-carriers between which the mutual orthogonality is maintained. The OFDM scheme is more robust against a frequency selective multi-path fading channel than a conventional single carrier modulation scheme. Therefore, the OFDM scheme is proper for a high speed packet data service.

In order to overcome the fading phenomenon in the OFDM system, the following two types of technology are used at the time of channel transmission, Adaptive Modulation and Coding (AMC) technology and diversity technology.

First, according to the AMC technology, a modulation scheme and a coding scheme are adaptively adjusted according to the channel change of a downlink. In a typical OFDM system, a plurality of AMC sub-bands are defined, and each sub-band independently performs the AMC operation. Usually, multiple sub-carriers necessary for transmission of data to a predetermined mobile station are adjacent to each other. Therefore, the AMC technology can transmit data through an AMC sub-band including multiple adjacent sub-carriers having a good channel response characteristic and is thus proper for a traffic transmitted to a predetermined user.

Second, according to the diversity technology, a traffic is transmitted in a frequency domain and through resources distributed in a time domain. The characteristic of a wireless channel changes in various ways along the time axis, and fluctuation of the channel characteristic between good and bad channel characteristics is repeated along the frequency axis. The diversity technology is targeting to enable the link with a mobile station in a wireless environment as described above to experience both a good channel environment and a bad channel environment as equally as possible. The diversity technology is proper for transmission of a traffic sensitive to the delay or a traffic of a channel commonly used by a plurality of users.

As described above, the two types of technology used in order to overcome the fading phenomenon in the OFDM system, that is, the AMC technology and the diversity technology, have characteristics showing a contrast to each other and have different types of traffics proper for use. Therefore, it is necessary to operate a system while properly mixing the two types of technology instead of applying only one type of technology to an OFDM system. In the OFDM system, a resource transmitted according to the AMC technology is called a Distributed Resource Channel (DRCH).

In the OFDM system, according to the allocation scheme of frequency resources (i.e. sub-carriers), the channel type of a traffic channel can be classified into DRCH for allocating sub-carriers in a distributed manner and Block Resource Channel (BRCH) for adjacently allocating sub-carriers. According to the DRCH, tones allocated in order to obtain the frequency diversity as much as possible are distributed over the entire frequency band as widely as possible. In contrast, in order to facilitate interference estimation, the BRCH includes adjacent tones in the frequency axis. Methods for multiplexing the above two types of channels can be divided into two multiplexing (hereinafter, mux) modes of a resource channel like the examples illustrated in FIGS. 1 and 2.

FIGS. 1 and 2 illustrate examples of resource allocation by mux modes of DRCH and BRCH in a typical OFDM system. Each of FIGS. 1 and 2 illustrates one physical channel (PHY) including eight OFDM symbols.

FIG. 1 illustrates a first mode for multiplexing and transmitting a DRCH and a BRCH (hereinafter, mux mode 1). In the mux mode 1, resources 110 to be allocated to the DRCH are appointed, and resources 120 to be allocated to the BRCH are then appointed. At this time, the resources 110 to be allocated to the DRCH cannot be reallocated to the BRCH. In the mux mode 1, a common pilot is used as a pilot channel for channel estimation and data demodulation, for example, as a Forward Link-Common Pilot Channel (F-CPICH).

FIG. 2 illustrates a second mode for multiplexing and transmitting a DRCH and a BRCH (hereinafter, mux mode 2). In the mux mode 2, the entire frequency resources are divided into a plurality of sub-bands, which include a DRCH sub-band 220 usable as the DRCH and a BRCH sub-band 210 usable as the BRCH. For channel estimation in the mux mode 2, the DRCH sub-band 220 uses a common pilot as in the mux mode 1, and the BRCH sub-band 210 uses a dedicated pilot.

FIG. 3 illustrates an example of a dedicated pilot format of the BRCH in the mux mode 2.

In FIG. 3, pilot formats 310, 320, and 330 have a tile structure including 16 tones along a frequency axis and 8 OFDM symbols along a time axis. Reference numeral 302 denotes a pilot tone, and reference numeral 304 denotes a data tone used as a control channel or a data channel. In the mux mode 2, dedicated pilot tones used in the case of the BRCH use the same power as that of neighbor data tones transmitted to each user, differently from the common pilot used in the mux mode 1. Which one will be used from among the formats of the dedicated pilot is determined based on either a speed of a mobile station or if Multiple-Input Multiple-Out (MIMO) is used.

In a typical OFDM system, format information of a dedicated pilot is transmitted to a mobile station through a Forward Link Shared Control Channel (F-SCCH), which is a control channel of a forward link. The F-SCCH carries various control channel messages, and a format of a dedicated pilot is carried from a base station to a mobile station by one field of a Forward Link Assignment Message (FLAM), which is one of control channel messages. However, format information of a dedicated pilot is necessary only in the case of transmitting the BRCH in the mux mode 2 and is unnecessary in other cases. Therefore, if one field of the FLAM is always used as format information of a dedicated pilot, it may be a wasteful use of resources of the control channel.

SUMMARY OF THE INVENTION

An aspect of the present invention is to substantially solve at least the above problems and/or disadvantages and to provide at least the advantages below. Accordingly, one aspect of the present invention is to provide an apparatus and a method for transmitting a control channel message, which can reduce resource waste in an Orthogonal Frequency Division Multiplexing (OFDM) system and using both a Block Resource Channel (BRCH) and a Distributed Resource Channel (DRCH) in a frequency axis.

Another aspect of the present invention is to provide an apparatus and a method which can transmit different pieces of control information through control channel messages according to mux mode and channel type in OFDM system multiplexing and using a BRCH and a DRCH in a frequency axis.

According to one aspect of the present invention, there is provided an apparatus for transmitting a control channel message in a mobile communication system. The apparatus includes a controller for generating a predetermined field and outputting a control channel message including the predetermined field, the predetermined field indicating a precoding index when a common pilot is used for data demodulation in a mobile station and indicating a pilot format of a dedicated pilot when the dedicated pilot is used for data demodulation in the mobile station, the precoding index indicating a weight value for beam-forming of each antenna; and a transmission module for converting the control channel message into a wireless signal and transmitting the wireless signal to the mobile station.

According to another aspect of the present invention, there is provided a method for transmitting a control channel message in a mobile communication system. The method includes generating a predetermined field that indicates a preceding index when a common pilot is used for data demodulation in a mobile station and indicates a pilot format of a dedicated pilot when the dedicated pilot is used for data demodulation in the mobile station, the precoding index indicating a weight value for beam-forming of each antenna; outputting a control channel message including the predetermined field; and converting the control channel message into a wireless signal and transmitting the wireless signal to the mobile station.

According to still another aspect of the present invention, there is provided an apparatus for receiving a control channel message in a mobile communication system. The apparatus includes a reception module for receiving a control channel message through a control channel; and a controller for extracting a predetermined field from the control channel message and analyzing the predetermined field in different manners according to if a pilot used for data demodulation in a mobile station is a common pilot or a dedicated pilot, the predetermined field indicating a preceding index when the common pilot is used for data demodulation in the mobile station and indicating a pilot format of the dedicated pilot when the dedicated pilot is used for data demodulation in the mobile station, the precoding index indicating a weight value for beam-forming of each antenna.

According to yet another aspect of the present invention, there is provided a method for receiving a control channel message in a mobile communication system. The method includes receiving a control channel message through a control channel; extracting a predetermined field from the control channel message, the predetermined field indicating a precoding index when a common pilot is used for data demodulation in a mobile station and indicating a pilot format of a dedicated pilot when the dedicated pilot is used for data demodulation in the mobile station, the precoding index indicating a weight value for beam-forming of each antenna; and analyzing the predetermined field in different manners according to if a pilot used for data demodulation in the mobile station is the common pilot or the dedicated pilot.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described with reference to the accompanying drawings. In the following description, a detailed description of known functions and configurations incorporated herein will be omitted when it may make the subject matter of the present invention rather unclear.

Advantageously, the present invention provides an apparatus and method for reducing resource waste by using redundant bits of a control channel message transmitted to a mobile station in a predetermined mux mode of a data resource channel in an Orthogonal Frequency Division Multiplexing (OFDM) system for transmission of other control information.

In the following detailed description of the present invention, an OFDM-based cellular wireless communication system, especially a mobile communication standard according to the $3^{rd}$ Generation Partnership Project 2 (3GPP2) UMB, is discussed. However, the present invention can be also applied to other mobile communication systems having similar technical background and resource types with slight modification without departing from the scope of the present invention, as is apparent to one skilled in the art.

Figure 1:
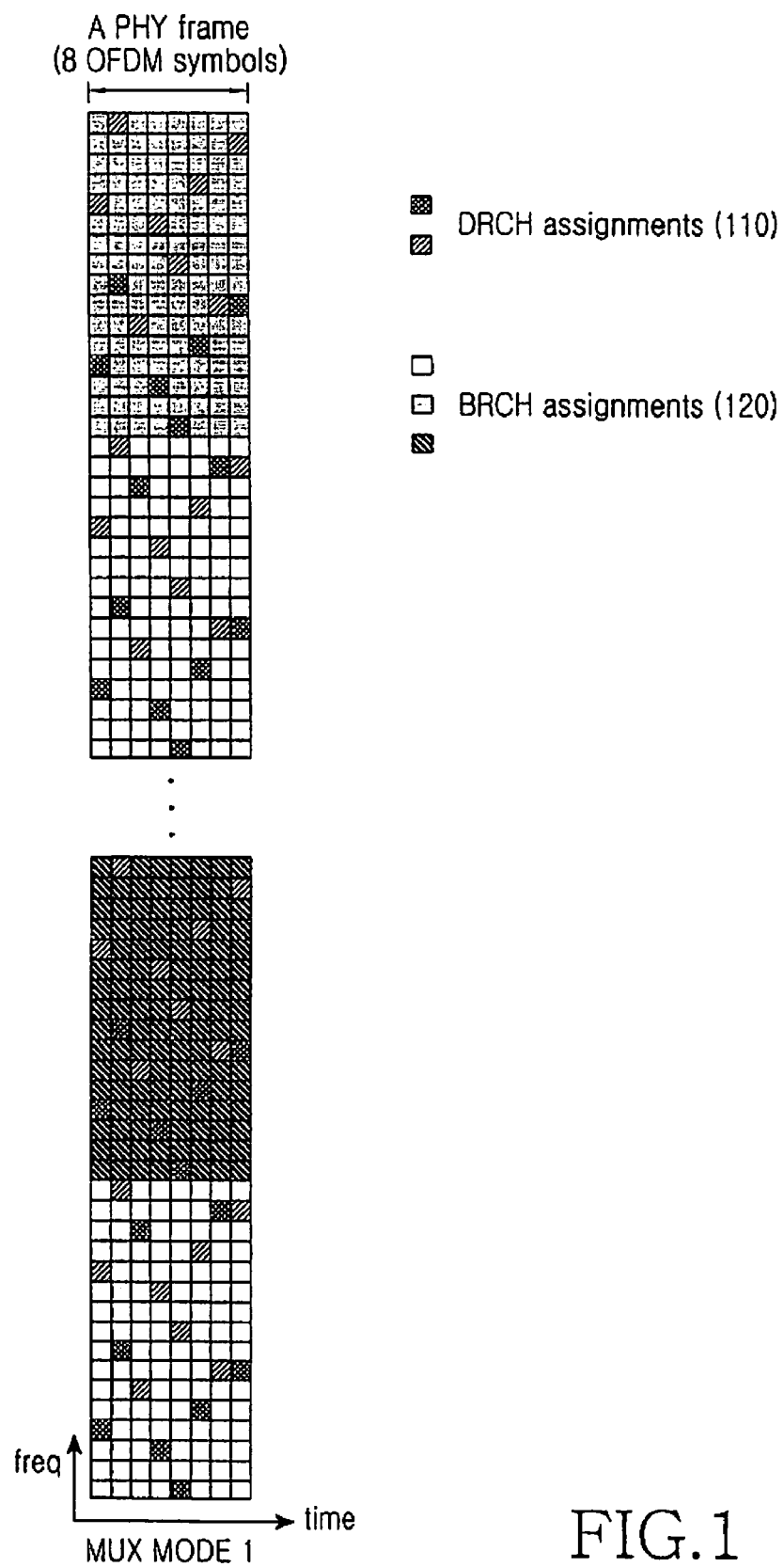
FIG. 1 illustrates a first mode for multiplexing and transmitting a DRCH and a BRCH according to the prior art.
Figure 2:
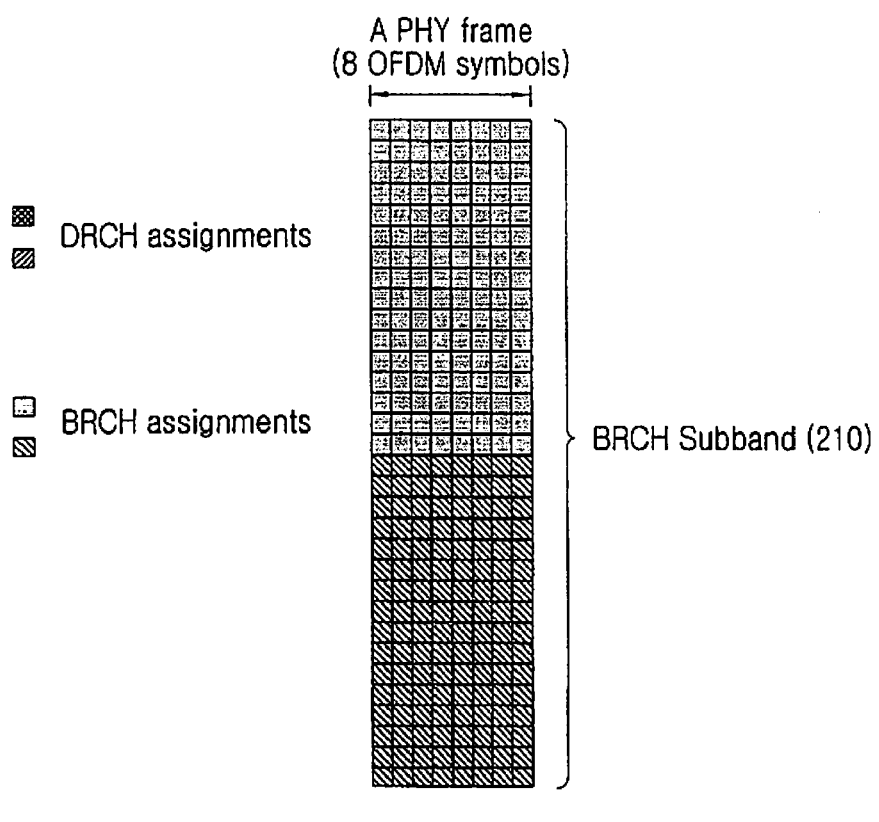
FIG. 2 illustrates a second mode for multiplexing and transmitting a DRCH and a BRCH according to the prior art.
Figure 2:
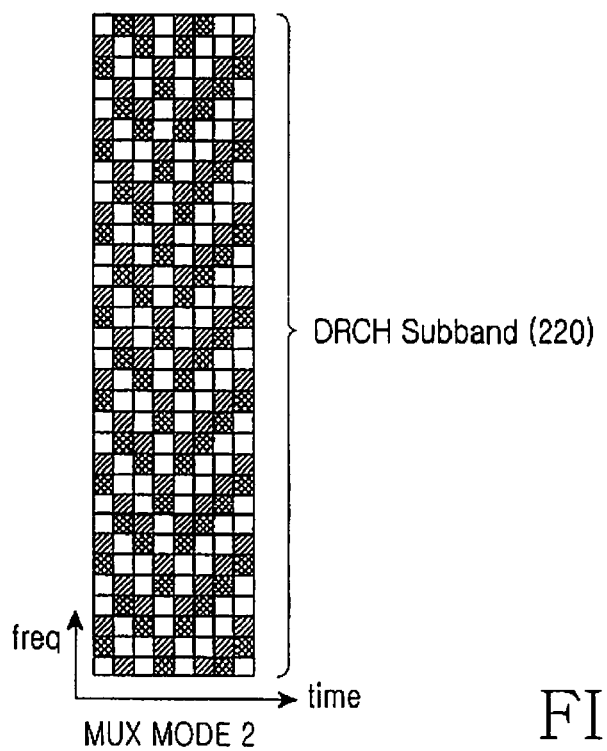
Figure 3:
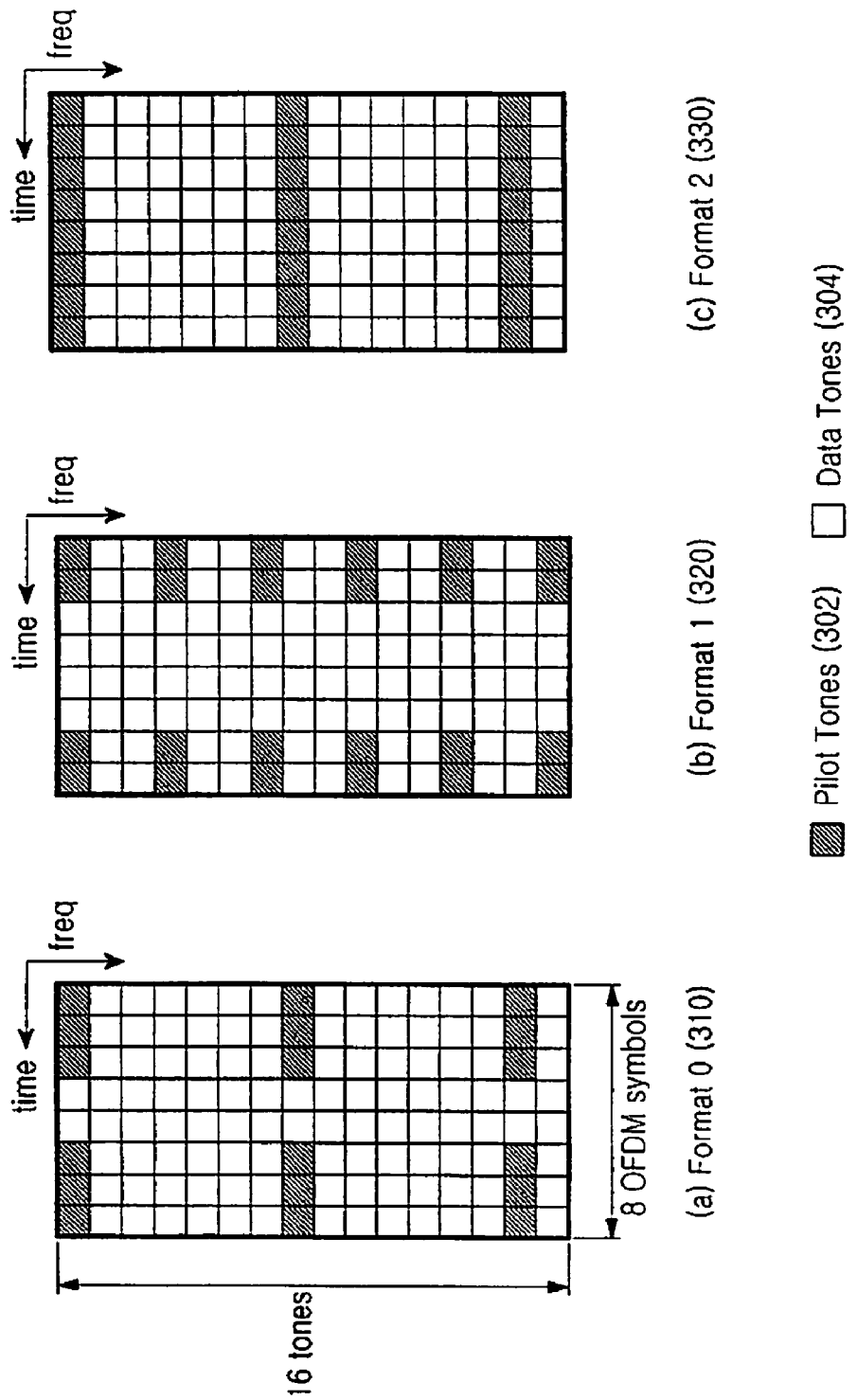
FIG. 3 illustrates an example of a dedicated pilot format of the BRCH in the mux mode 2 according to the prior art.
Figure 4:
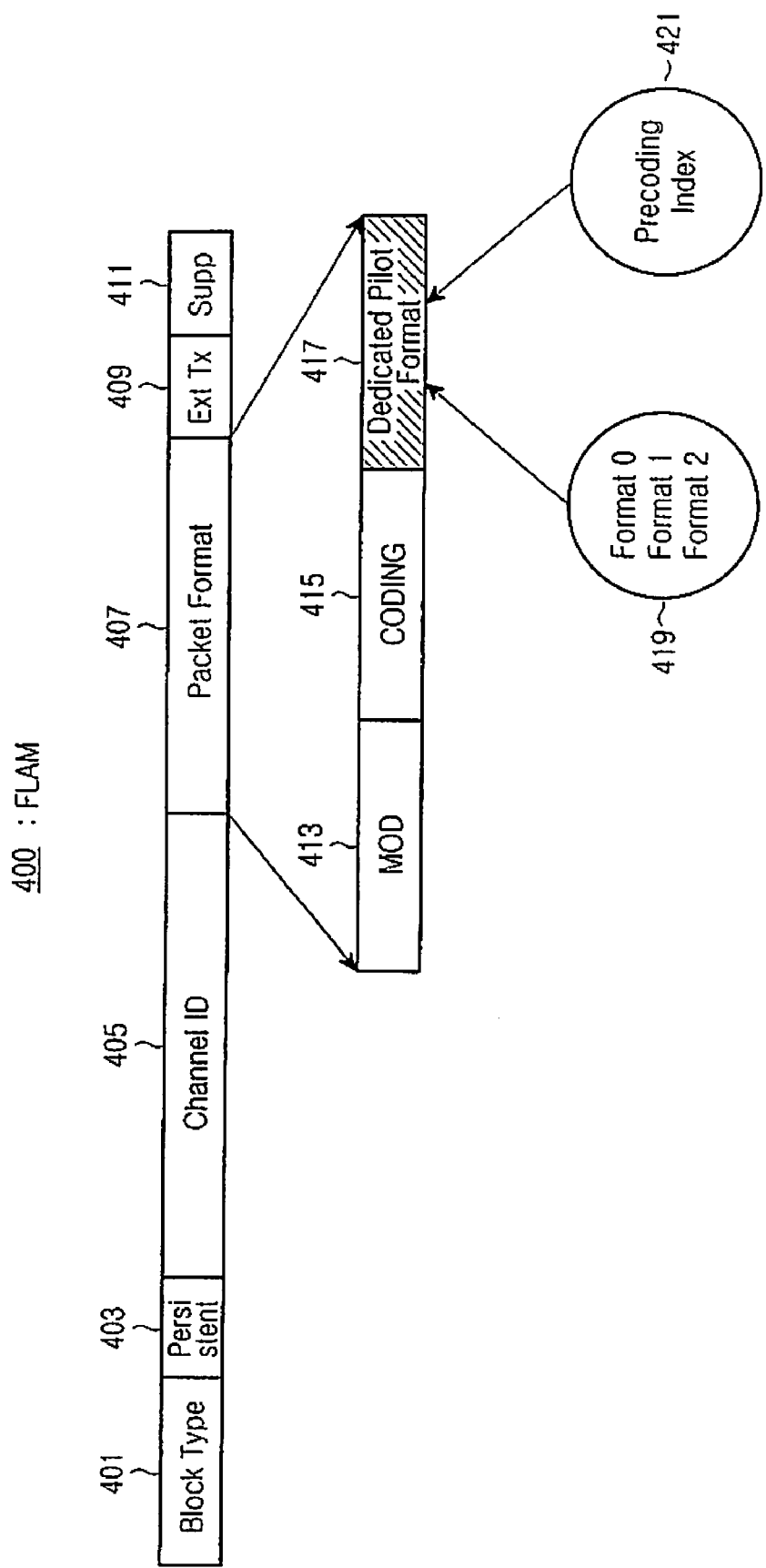
FIG. 4 illustrates an example of a control channel message transmitting different pieces of control information according to the mux mode and channel type in an OFDM system according to the present invention.

FIG. 4 illustrates an example of a control channel message transmitting different pieces of control information according to the mux mode of a resource channel and channel type in an OFDM system according to the present invention. As an example of the control channel message, FIG. 4 illustrates a Forward Link Assignment Message (FLAM) 400 transmitted through an F-SCCH. The FLAM includes resource allocation information for each user, which indicates a data channel resource allocated to each mobile station.

In FIG. 4, the FLAM 400 includes a block type field 401, a persistent assignment information field 403, a channel identifier (ID) field 405, a Packet Format (PF) field 407, an extended transmission (Tx) field 409, and a supplement information field 411. From among the above-mentioned fields, the PF field 407 has a total of 6 bits, which include the first two bits indicating a modulation order 413, the middle two bits indicating a coding rate 415, and the last two bits indicating a dedicated pilot format 417. Here, a description of other fields having no important relation to the present invention is omitted.

The dedicated pilot format field 417 is effective only in the Block Resource Channel (BRCH) sub-band of the mux mode 2 for separately allocating frequency resources for the Distributed Resource Channel (DRCH) sub-band and the BRCH sub-band. Either in the case of the mux mode 1 or when the DRCH is used in the mux mode 2, the dedicated pilot format field 417 serves as redundant bits. Therefore, the present invention provides transmission of other control information through the dedicated pilot format field 417 when the dedicated pilot format field 417 serves as redundant bits. As an example of the other control information, an embodiment of the present invention introduces a precoding index indicating a weight for beam forming of each antenna in a forward link using a Multiple-Input Multiple-Out (MIMO) scheme. However, it is also possible to transmit other control information within a range of the two bit field. However, the embodiment shown in FIGS. 5 to 7 below is based on an assumption that the other control information is a precoding index. At this time, the two bit field 417 is called a pilot/MIMO field.

A Forward Data Channel (F-DCH) carries traffic transmitted to a mobile station, and a Forward Link Shared Control Channel (F-SCCH) refers to a forward control channel carrying various types of control information necessary for reception of the F-DCH. In the case of transmitting the F-DCH in the mux mode 1 or 2, the F-SCCH includes a FLAM that indicates a channel allocated to the mobile station. When the F-DCH is constituted by the BRCH according to the mux mode 2, the dedicated pilot format field 417 of the FLAM includes two bit information 419 indicating a dedicated pilot format of the BRCH. However, when the F-DCH is constituted either by the BRCH or DRCH according to the mux mode 1 or by the DRCH according to the mux mode 2, the dedicated pilot format field 417 of the FLAM includes other control information, such as the precoding index 421, other than the dedicated pilot format.

Figure 5:
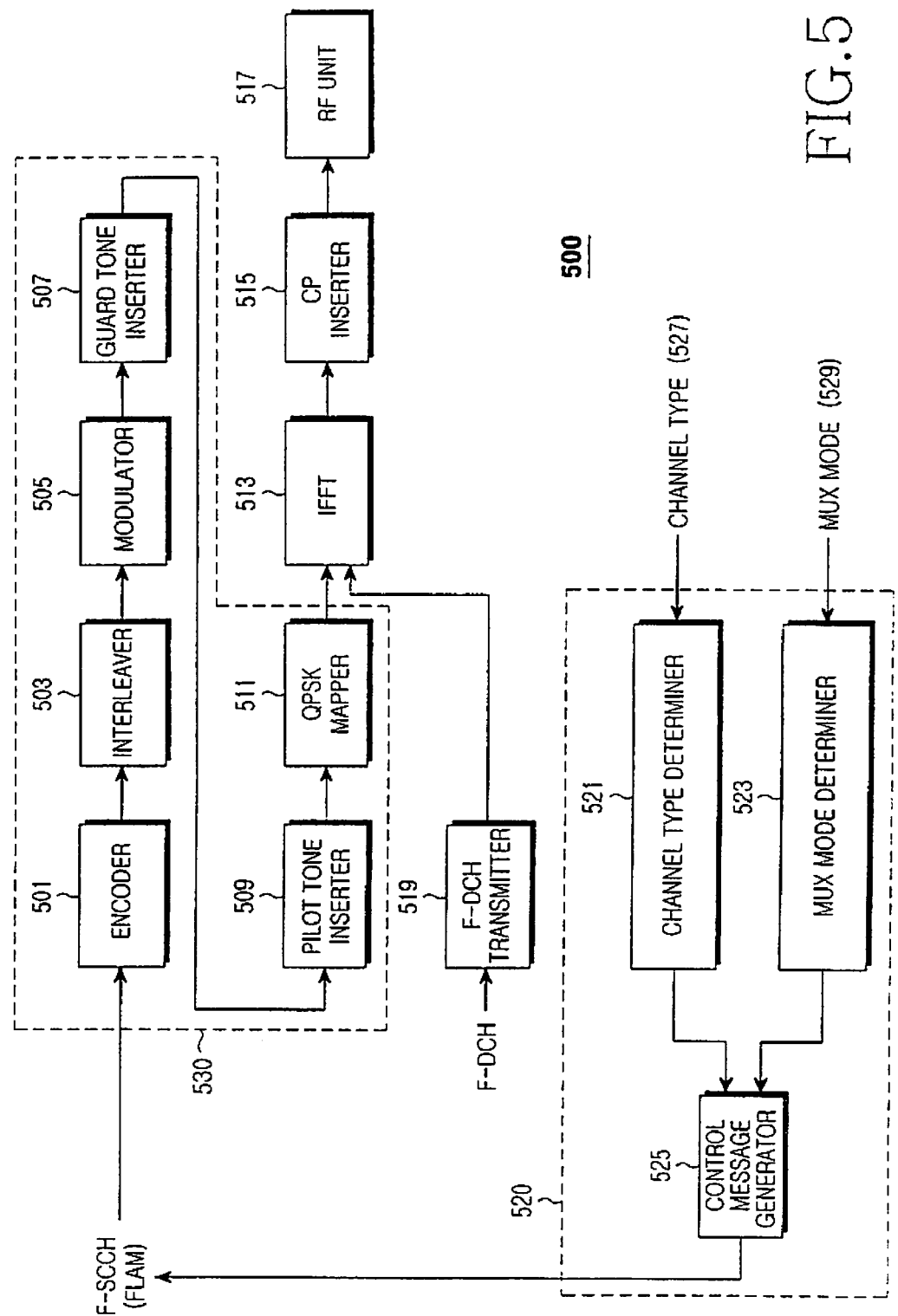
FIG. 5 is a block diagram illustrating a structure of a transmitting apparatus 500 in an OFDM system according to the present invention.

FIG. 5 is a block diagram illustrating a structure of a transmitting apparatus 500 in an OFDM system according to an exemplary embodiment of the present invention.

In FIG. 5, the transmitting apparatus 500 for transmitting data of the F-DCH and an FLAM of the F-SCCH includes a control channel transmission module 530 for generating OFDM symbols from control information of the F-SCCH and transmitting the generated OFDM symbols through a wireless network and an F-DCH transmitter 519 for encoding and modulating data of the F-DCH in order to transmit the data. The control channel transmission module 530 includes elements designated by reference numerals 501 to 517.

Specifically, the control channel transmission module 530 includes an encoder 501 for encoding control information transmitted from a physical layer (not shown), an interleaver 503 for interleaving the encoded data, a modulator 505 for modulating the interleaved data, a guard tone inserter 507 for inserting guard tones into the modulated data in order to reduce interference of signals out of the band, a pilot tone inserter 509 for inserting pilot tones to be used for channel estimation in a mobile station into the output data from the guard tone inserter 507, and a Quadrature Phase Shift Keying (QPSK) mapper 511 for mapping output data of the pilot tone inserter 509 to modulated symbols according to, for example, a QPSK scheme.

Further, the transmitting apparatus 500 includes an Inverse Fast Fourier Transform (IFFT) unit 513 for multiplexing the modulated symbols from the control channel transmission module 530 and the F-DCH transmitter 519 to be transmitted through the F-SCCH and the F-DCH and then performing IFFT on the multiplexed symbols, thereby modulating the symbols into OFDM symbols, a Cyclic Prefix (CP) inserter 515 for inserting CPs in order to prevent occurrence of intersymbol interference, and a Radio Frequency (RF) unit 517 for frequency up-converting the CP-inserted OFDM symbols to RF signals.

Reference numeral 520 denotes a controller for inserting a precoding index or pilot format information indicating a pilot format of a BRCH into a predetermined field of an FLAM according to the channel type of the F-DCH and the mux mode of the BRCH and the DRCH. The controller 520 includes a channel type determiner 521, a mux mode determiner 523, and a control message generator 525. The channel type determiner 521 acquires channel type information 527 according to the location of the F-DCH allocated to a mobile station and determines the channel type of the F-DCH, that is, determines if the F-DCH is constituted by the DRCH or the BRCH. The mux mode determiner 523 receives mux mode information 531 included in system information from a higher layer and determines if the mux mode 1 or the mux mode 2 is applied to the frequency resources of the current cell. Based on the result of the determination transmitted from the channel type determiner 521 and the mux mode determiner 523, the control message generator 525 generates and outputs a control channel message including pilot format information in a predetermined field in a case where the BRCH is transmitted in the mux mode 2, while generating and outputting a control channel message including a preceding index in the predetermined field in the other cases.

Figure 6:
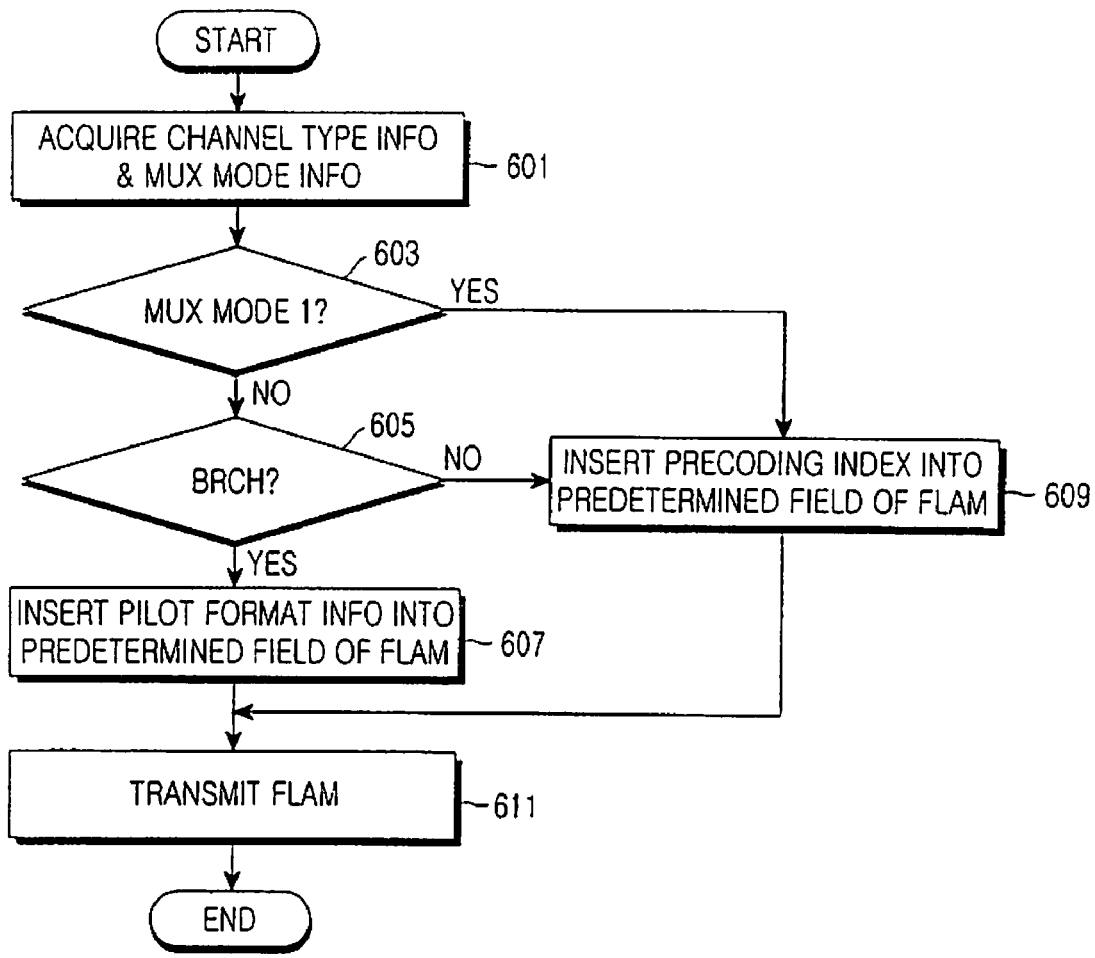
FIG. 6 is a flowchart illustrating a process of transmitting a control channel message in an OFDM system according to the present invention.

FIG. 6 is a flowchart illustrating a process of transmitting a control channel message in an OFDM system according to the present invention. Specifically, FIG. 6 illustrates a process of setting a predetermined field including different pieces of control information according to the channel type and the mux mode when an FLAM is transmitted as an example of a control channel message.

In FIG. 6, in step 601, the controller 520 acquires, from system information broadcasted from the system, mux mode information indicating if the mux mode applied to the frequency resources of the current cell is the mux mode 1 or the mux mode 2, and acquires channel type information indicating if the F-DCH of the mobile station is constituted by the BRCH or the DRCH according to the location of the F-DCH resource allocated to the mobile station. In step 603, the mux mode determiner 523 of the controller 520 determines based on the mux mode information if the mux mode applied to the frequency resources of the current cell is the mux mode 1 or the mux mode 2. Then, the mux mode determiner 523 proceeds to step 609 when the mux mode applied to the frequency resources of the current cell is the mux mode 1, and proceeds to step 605 when the mux mode applied to the frequency resources of the current cell is the mux mode 2. As described above, in the mux mode 1, resources for the DRCH are first allocated, and resources for the BRCH from among the remaining resources are then allocated. In the mux mode 2, the entire frequency resources are divided into a DRCH sub-band and a BRCH sub-band. Then, in step 605, the channel type determiner 521 of the controller 520 determines based on the channel type information if the F-DCH is constituted by the DRCH or the BRCH. Although step 603 for determining the mux mode precedes step 605 for determining the channel type in the process shown in FIG. 6, it is also possible to first perform step 605 and then perform step 603 when the channel type is the BRCH.

When it is determined in step 603 that the mux mode applied to the frequency resources of the current cell is the mux mode 2 and when it is determined in step 605 that the channel type of the F-DCH is the BRCH, a dedicated pilot is used in a resource area allocated to the mobile station. When a dedicated pilot is used as described above, the control message generator 525 of the controller 520 inserts, in step 607, pilot format information indicating the format of the dedicated pilot into a predetermined field of the FLAM.

Meanwhile, when it is determined in step 603 that the mux mode applied to the frequency resources of the current cell is the mux mode 1 or when it is determined in step 605 that the channel type of the F-DCH is the DRCH, a common pilot is used in order to perform channel estimation and data demodulation of a resource area allocated to the mobile station. When a common pilot is used as described above, the control message generator 525 of the controller 520 inserts, in step 609, a precoding index indicating a beam-forming weight for each antenna according to the MIMO scheme into the predetermined field of the FLAM. Then, in step 611, the control channel transmission module 530 transmits the FLAM including the predetermined field generated in step 607 or 609 through the F-SCCH.

Figure 7:
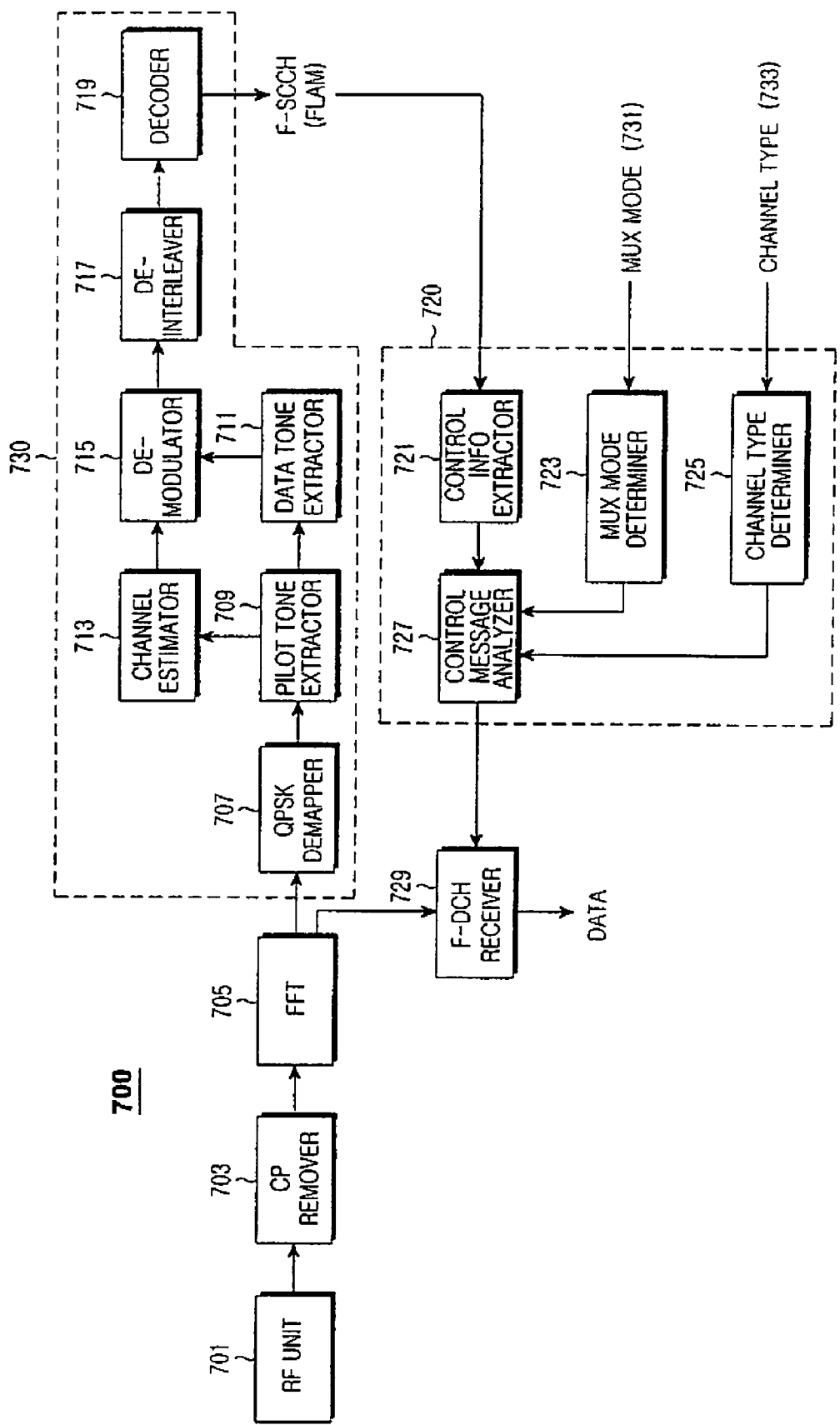
FIG. 7 is a block diagram illustrating a structure of a receiving apparatus in an OFDM system according to the present invention.

FIG. 7 is a block diagram illustrating a structure of a receiving apparatus in an OFDM system according to the present invention.

In FIG. 7, a structure of the receiving apparatus 700 receiving data of the F-DCH and an FLAM of the F-SCCH includes a control channel receiving module 730 for receiving OFDM symbols through a wireless channel and restoring control information of the F-SCCH from the OFDM symbols. The control channel receiving module 730 includes elements designated by reference numerals 707 to 719.

The receiving apparatus 700 further includes an RF unit 701 for outputting a baseband signal by frequency down-converting an RF signal received through a wireless channel, a CP remover 703 for outputting the OFDM symbols by removing CPs contaminated due to multi-paths, electric wave delay, etc. from the RF signal, and a Fast Fourier Transform (FFT) unit 705 for converting the CP-removed OFDM symbols into modulation symbols corresponding to OFDM tones by FFTing the CP-removed OFDM symbols.

The control channel receiving module 730 includes a QPSK demapper for demapping modulation symbols of the control channel from among the modulation symbols from the FFT unit 705 according to, for example, a QPSK scheme to output tones of the control channel, a pilot tone extractor 709 for extracting pilot tones of predetermined locations from the tones of the control channel, a data tone extractor 711 for extracting data tones of the control channel except for the pilot tones from the tones of the control channel, a channel estimator 713 for estimating a channel characteristic by using the pilot tones, a demodulator 715 for demodulating the data tones by using a result of the channel estimation, a deinterleaver 717 for deinterleaving the demodulated data, and a decoder for decoding the deinterleaved data to restore the FLAM.

Reference numeral 720 denotes a controller for determining if the predetermined field of the FLAM contains pilot format information or a precoding index, based on the control channel, that is, based on the channel type of the F-DCH and the mux mode of the BRCH and the DRCH, and then transferring the control information of the FLAM to the F-SCH receiver 729.

The controller 720 includes a control information extractor 721 for extracting the predetermined field of the FLAM transmitted from the control channel receiving module 730, a mux mode determiner 723 for acquiring mux mode information 731 included in the system information from a higher layer and determining if the mux mode applied to frequency resources of a current cell is the mux mode 1 or the mux mode 2, a channel type determiner 725 for determining, from a channel identifier within the FLAM, if the channel type 733 according to the location of the F-DCH resource allocated to the mobile station is the BRCH or the DRCH, and a control message analyzer 727 for determining if the predetermined field of the FLAM contains a precoding index or pilot format information indicating the pilot format of the mux mode 2/BRCH, based on results of the determination from the mux mode determiner 723 and the channel type determiner 725, analyzing control information of the FLAM including the predetermined field based on the determination, and then transmitting the analyzed information for use in data channel demodulation in the F-DCH receiver 729.

Based on the control information transmitted from the controller 720, the F-DCH receiver 729 demodulates and decodes the modulation symbols of the data channel transmitted from the FFT unit 705.

Figure 8:
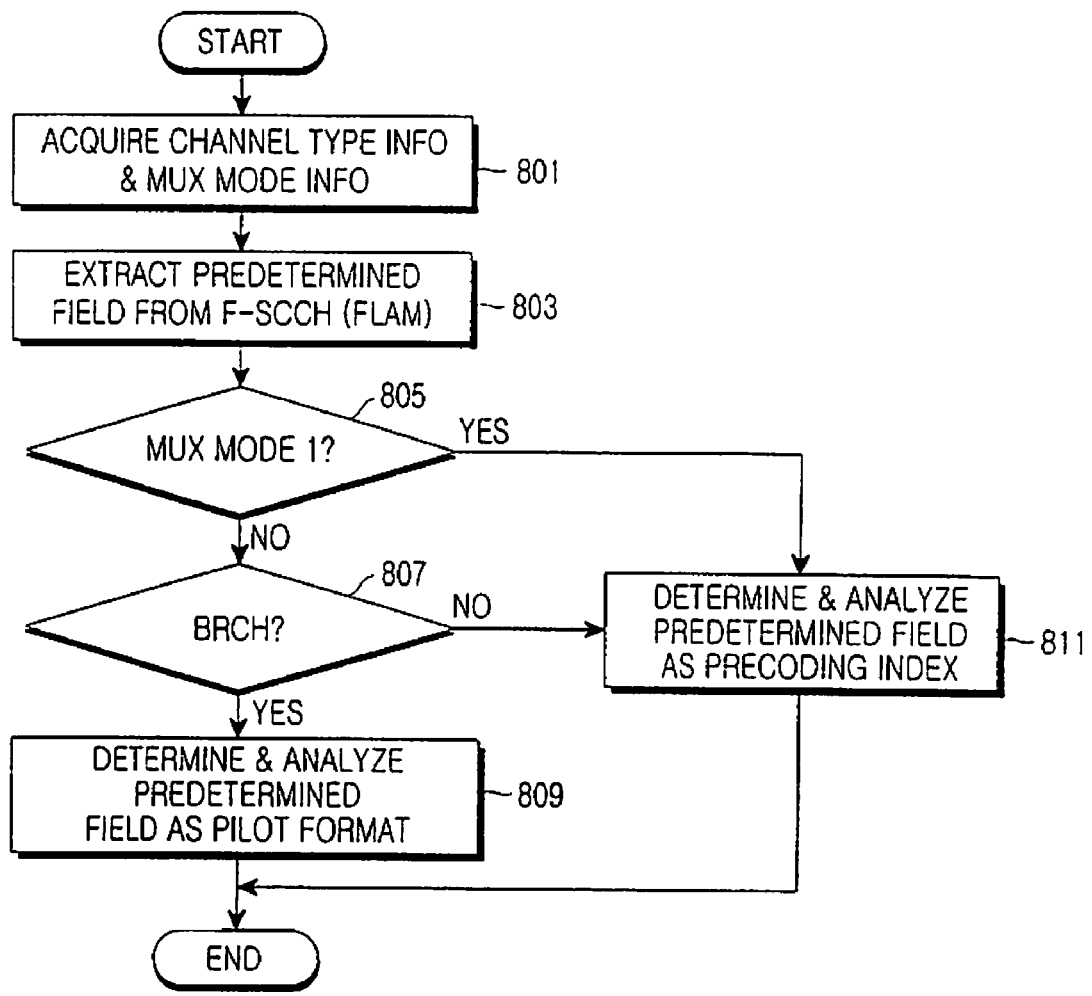
FIG. 8 is a flowchart illustrating a process of receiving a control channel message in an OFDM system according to the present invention.

FIG. 8 is a flowchart illustrating a process of receiving a control channel message in an OFDM system according to the present invention. Specifically, FIG. 8 illustrates a process of analyzing a predetermined field including different pieces of control information according to the channel type and the mux mode when an FLAM is received as an example of a control channel message.

In FIG. 8, in step 801, the controller 720 acquires, from the system information received from the system, the mux mode information indicating if the mux mode applied to the frequency resources of the current cell is the mux mode 1 or the mux mode 2, and acquires the channel type information indicating if the F-DCH of the mobile station is constituted by the BRCH or the DRCH according to the location of the F-DCH resource allocated to the mobile station. Then, in step 803, the control information extractor 721 of the controller 720 extracts a predetermined field of the FLAM and transfers the extracted field to the control message analyzer 727. Then, the data mux mode determiner 723 of the controller 720 determines, based on the mux mode information, if the mux mode applied to the frequency resources of the current cell is the mux mode 1 or the mux mode 2 in step 805, and the channel type determiner 721 of the controller 720 determines, based on the channel type information, if the F-DCH is constituted by the DRCH or the BRCH in step 807. Although step 805 for determining the mux mode precedes step 807 for determining the channel type in the process shown in FIG. 8, it is also possible to first perform step 807 and then perform step 805 when the channel type is the BRCH.

When it is determined in step 805 that the mux mode applied to the frequency resources of the current cell is the mux mode 2 and when it is determined in step 807 that the channel type of the F-DCH is the BRCH, a dedicated pilot is used in a resource area allocated to the mobile station. When a dedicated pilot is used as described above, the control message analyzer 727 of the controller 720 recognizes the predetermined field transferred from the control information extractor 721 as pilot format information indicating the pilot format of the BRCH and transfers the pilot format information to the F-DCH receiver 729 in step 809.

Meanwhile, when it is determined in step 805 that the mux mode applied to the frequency resources of the current cell is the mux mode 1 or when it is determined in step 807 that the channel type of the F-DCH is the DRCH, a common pilot is used for channel estimation and data demodulation of a resource area allocated to the mobile station. When a common pilot is used as described above, the control message generator 725 of the controller 720 recognizes the predetermined field transferred from the control information extractor 721 as a precoding index indicating a beam-forming weight for each antenna according to the MIMO scheme and transfers the precoding index to the F-DCH receiver 729 in step 811. Then, the F-DCH receiver 729 performs channel estimation by extracting dedicated pilot tones from tones of the data channel by using the pilot format information and demodulates the tones of the data channel by using the precoding index.

The present invention as described above can reduce resource waste of a control channel by inserting different pieces of information to a predetermined field included in the control channel message according to the channel type and the mux mode of a resource channel in an OFDM system, and enables the efficient use of resources by transmitting different types of control information through redundant bits of a control channel message.

While the invention has been shown and described with reference to certain exemplary embodiments thereof, it will be understood by those skilled in the art that various changes in form and details may be made therein without departing from the spirit and scope of the invention as defined by the appended claims. For example, the format of the control channel message shown in FIG. 4 is only an example, and the control channel message may have various construction and can be set in various ways. Therefore, the scope of the invention cannot be limited to the embodiments described herein and should be determined by the appended claims and equivalents thereof.

What is claimed is:

1. An apparatus for transmitting a control channel message in a mobile communication system, the apparatus comprising:
    a controller for generating a predetermined field and outputting a control channel message including the predetermined field, the predetermined field indicating a precoding index when a common pilot is used for data demodulation in a mobile station and indicating a pilot format of a dedicated pilot when the dedicated pilot is used for data demodulation in the mobile station, the precoding index indicating a weight value for beamforming of each antenna; and
    a transmission module for converting the control channel message into a wireless signal and transmitting the wireless signal to the mobile station.

2. The apparatus as claimed in claim 1, wherein the controller determines that:
    the common pilot is used in entire frequency resources in a case of a first multiplexing mode of a resource channel in which resources to be allocated to a Distributed Resource Channel (DRCH) are appointed from among the entire frequency resources and resources to be allocated to a Block Resource Channel (BRCH) are then appointed from among remaining frequency resources; and
    the common pilot is used for the resources to be allocated to the DRCH in a second multiplexing mode of the resource channel in which the entire frequency resources are divided into a DRCH sub-band for the DRCH and a BRCH sub-band for the BRCH.

3. The apparatus as claimed in claim 2, wherein the controller further determines that the dedicated pilot is used for the resources to be allocated to the BRCH in the second multiplexing mode in which the entire frequency resources are divided into the DRCH sub-band for the DRCH and the BRCH sub-band for the BRCH.

4. The apparatus as claimed in claim 3, wherein the controller uses multiplexing mode information included in system information broadcasted by a system in order to determine if it is the first multiplexing mode or the second multiplexing mode.

5. The apparatus as claimed in claim 4, wherein the controller uses channel type information according to resources of a data channel allocated to the mobile station in order to determine if the data channel is the DRCH or the BRCH.

6. The apparatus as claimed in claim 1, wherein the predetermined field comprises two bits indicating a pilot format determined for the mobile station from among a plurality of predetermined pilot formats when the dedicated pilot is used.

7. A method for transmitting a control channel message in a mobile communication system, the method comprising the steps of:
    generating a predetermined field that indicates a preceding index when a common pilot is used for data demodulation in a mobile station and indicates a pilot format of a dedicated pilot when the dedicated pilot is used for data demodulation in the mobile station, the preceding index indicating a weight value for beam-forming of each antenna;
    outputting a control channel message including the predetermined field; and
    converting the control channel message into a wireless signal and transmitting the wireless signal to the mobile station.

8. The method as claimed in claim 7, further comprising:
determining that the common pilot is used in entire frequency resources, in a first multiplexing mode of a resource channel in which resources to be allocated to a Distributed Resource Channel (DRCH) are appointed from among the entire frequency resources and resources to be allocated to a Block Resource Channel (BRCH) are then appointed from among remaining frequency resources; and
determining that the common pilot is used for the resources to be allocated to the DRCH, in a second multiplexing mode of the resource channel in which the entire frequency resources are divided into a DRCH sub-band for the DRCH and a BRCH sub-band for the BRCH.

9. The method as claimed in claim 8, further comprising determining that the dedicated pilot is used for the resources to be allocated to the BRCH in the second multiplexing mode in which the entire frequency resources are divided into the DRCH sub-band for the DRCH and the BRCH sub-band for the BRCH.

10. The method as claimed in claim 9, further comprising acquiring multiplexing mode information included in system information broadcasted by a system in order to determine if it is the first multiplexing mode or the second multiplexing mode.

11. The method as claimed in claim 10, further comprising acquiring channel type information according to resources of a data channel allocated to the mobile station in order to determine if the data channel is the DRCH or the BRCH.

12. The method as claimed in claim 7, wherein the predetermined field comprises two bits indicating a pilot format determined for the mobile station from among a plurality of predetermined pilot formats when the dedicated pilot is used.

13. An apparatus for receiving a control channel message in a mobile communication system, the apparatus comprising:
a reception module for receiving a control channel message through a control channel; and
a controller for extracting a predetermined field from the control channel message and analyzing the predetermined field according to if a common pilot or a dedicated pilot is used for data demodulation in a mobile station, the predetermined field indicating a precoding index when the common pilot is used and indicating a pilot format of the dedicated pilot when the dedicated pilot is used, the precoding index indicating a weight value for beam-forming of each antenna.

14. The apparatus as claimed in claim 13, wherein the controller determines that:
the common pilot is used in entire frequency resources in a case of a first multiplexing mode of a resource channel in which resources to be allocated to a Distributed Resource Channel (DRCH) are appointed from among the entire frequency resources and resources to be allocated to a Block Resource Channel (BRCH) are then appointed from among remaining frequency resources; and
the common pilot is used for the resources to be allocated to the DRCH in a second multiplexing mode of the resource channel in which the entire frequency resources are divided into a DRCH sub-band for the DRCH and a BRCH sub-band for the BRCH.

15. The apparatus as claimed in claim 14, wherein the controller further determines that the dedicated pilot is used for the resources to be allocated to the BRCH in the second multiplexing mode in which the entire frequency resources are divided into the DRCH sub-band for the DRCH and the BRCH sub-band for the BRCH.

16. The apparatus as claimed in claim 15, wherein the controller uses multiplexing mode information included in system information broadcasted by a system in order to determine if it is the first multiplexing mode or the second multiplexing mode.

17. The apparatus as claimed in claim 16, wherein the controller uses channel type information according to resources of a data channel allocated to the mobile station in order to determine if the data channel is the DRCH or the BRCH.

18. The apparatus as claimed in claim 13, wherein the predetermined field comprises two bits indicating a pilot format determined for the mobile station from among a plurality of predetermined pilot formats when the dedicated pilot is used.

19. A method for receiving a control channel message in a mobile communication system, the method comprising the steps of:
receiving a control channel message through a control channel;
extracting a predetermined field from the control channel message, the predetermined field indicating a preceding index when a common pilot is used for data demodulation in a mobile station and indicating a pilot format of a dedicated pilot when the dedicated pilot is used for data demodulation in the mobile station, the precoding index indicating a weight value for beam-forming of each antenna; and
analyzing the predetermined field according to if the common pilot or the dedicated pilot is used for data demodulation in the mobile station.

20. The method as claimed in claim 19, further comprising:
determining that the common pilot is used in entire frequency resources, in a first multiplexing mode of a resource channel in which resources to be allocated to a Distributed Resource Channel (DRCH) are appointed from among the entire frequency resources and resources to be allocated to a Block Resource Channel (BRCH) are then appointed from among remaining frequency resources; and
determining that the common pilot is used for the resources to be allocated to the DRCH, in a second multiplexing mode of the resource channel in which the entire frequency resources are divided into a DRCH sub-band for the DRCH and a BRCH sub-band for the BRCH.

21. The method as claimed in claim 20, further comprising determining that the dedicated pilot is used for the resources to be allocated to the BRCH in the second multiplexing mode in which the entire frequency resources are divided into the DRCH sub-band for the DRCH and the BRCH sub-band for the BRCH.

22. The method as claimed in claim 21, further comprising acquiring multiplexing mode information included in system information broadcasted by a system in order to determine if it is the first multiplexing mode or the second multiplexing mode.

23. The method as claimed in claim 22, further comprising acquiring channel type information according to resources of a data channel allocated to the mobile station in order to determine if the data channel is the DRCH or the BRCH.

24. The method as claimed in claim 19, wherein the predetermined field comprises two bits indicating a pilot format determined for the mobile station from among a plurality of predetermined pilot formats when the dedicated pilot is used.

\* \* \* \* \*